(12) United States Patent
Wielenga

(10) Patent No.: US 7,841,065 B1
(45) Date of Patent: Nov. 30, 2010

(54) METHOD OF MANUFACTURING A LOAD BEAM TO ADJUST DROOP ANGLE

(75) Inventor: Leroy Dwayne Wielenga, Oceanside, CA (US)

(73) Assignee: Magnecomp Corporation, Murrieta, CA (US)

(*) Notice: Subject to any disclaimer, the term of this patent is extended or adjusted under 35 U.S.C. 154(b) by 713 days.

(21) Appl. No.: 11/753,505

(22) Filed: May 24, 2007

(51) Int. Cl.
*G11B 5/127* (2006.01)
*H04R 31/00* (2006.01)

(52) U.S. Cl. ............... 29/603.03; 29/603.04; 29/603.06; 29/603.07; 360/244.2; 360/244.3; 360/245.9

(58) Field of Classification Search ............... 29/603.03, 29/603.04, 603.06, 603.07; 360/244.2, 244.3, 360/245.9
See application file for complete search history.

(56) References Cited

U.S. PATENT DOCUMENTS

| | | | | |
|---|---|---|---|---|
| 5,921,131 A | * | 7/1999 | Stange | 72/379.2 |
| 6,078,470 A | * | 6/2000 | Danielson et al. | 360/245.1 |

* cited by examiner

*Primary Examiner*—Paul D Kim
(74) *Attorney, Agent, or Firm*—Intellectual Property Law; Offices of Joel Voetzke, APC

(57) ABSTRACT

A load beam having a bent rail, a suspension that includes the load beam, and a related method for manufacturing a load beam. The method includes providing the load beam before the bent rail is formed, and coining the load beam at a location where the bend will occur in the rail.

17 Claims, 10 Drawing Sheets

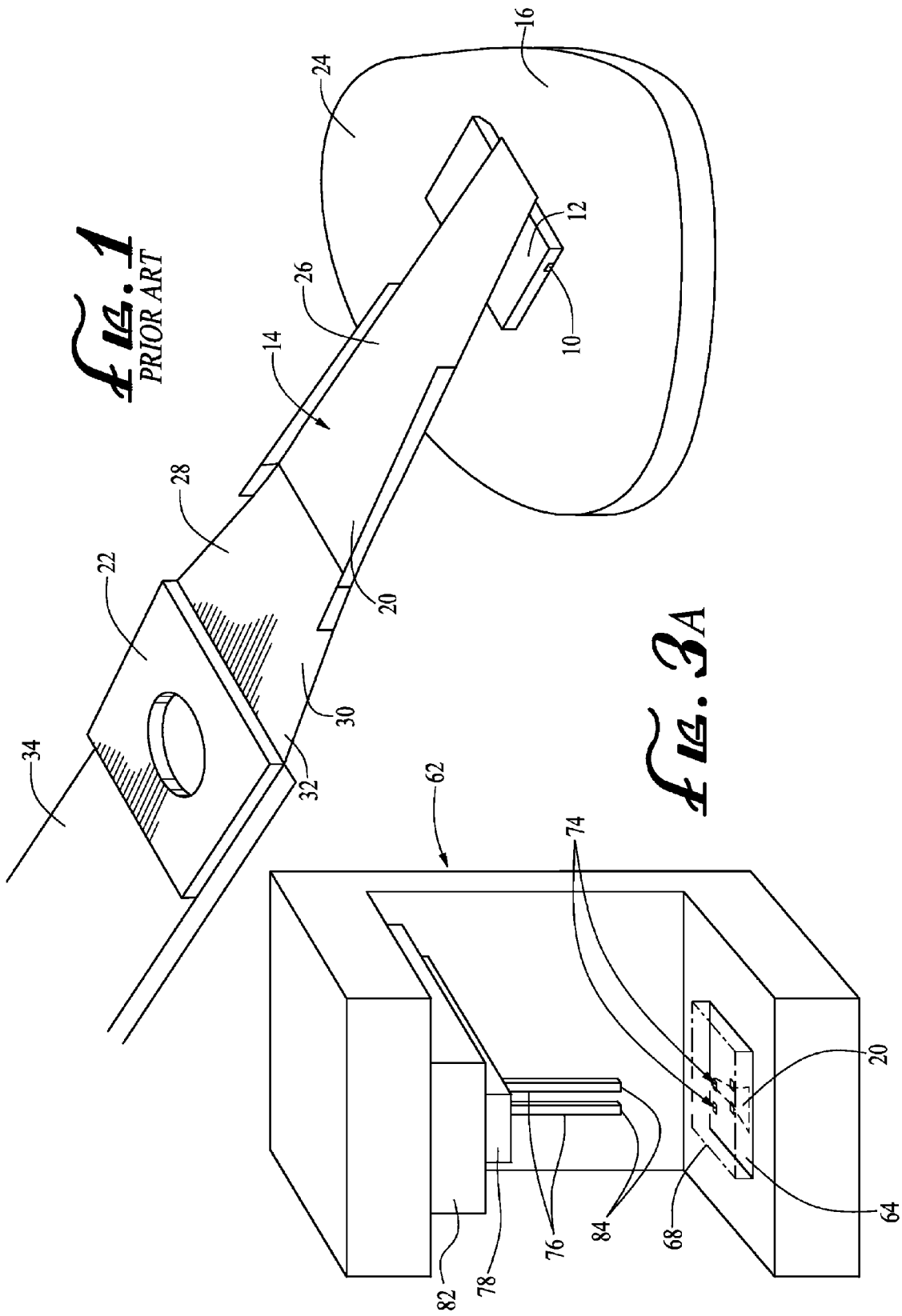

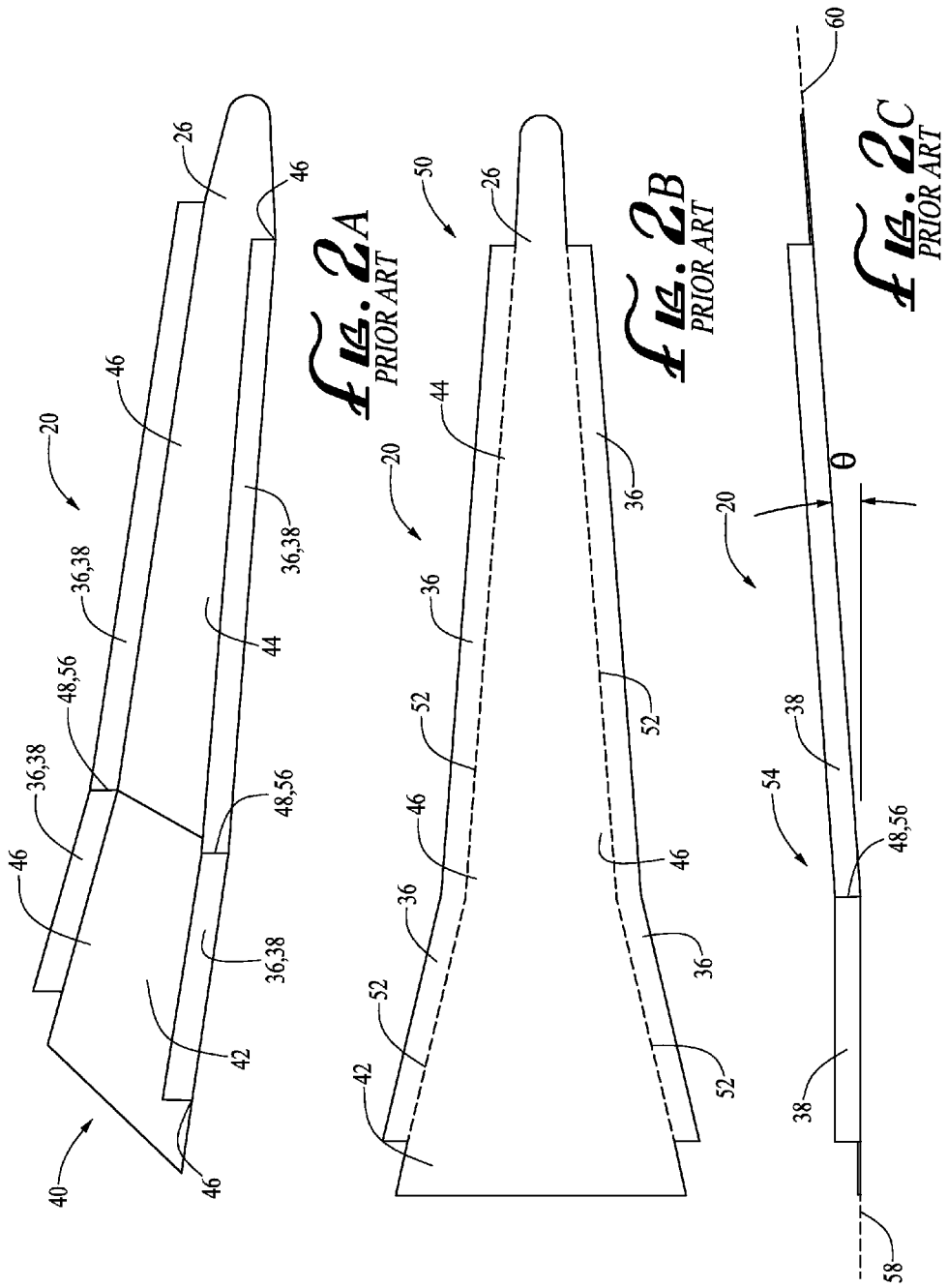

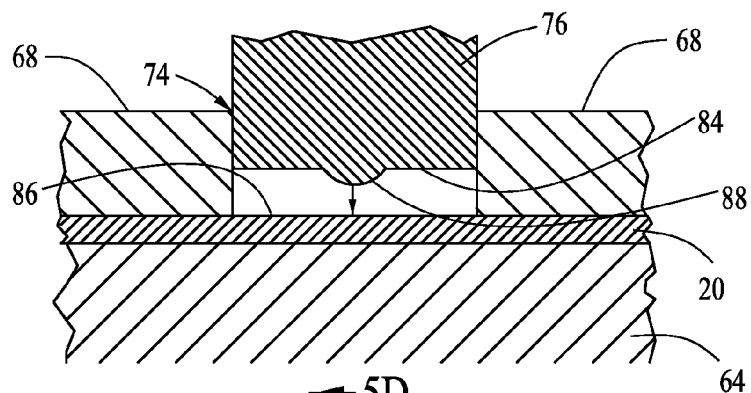
FIG. 5A
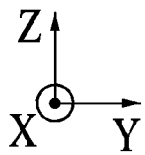
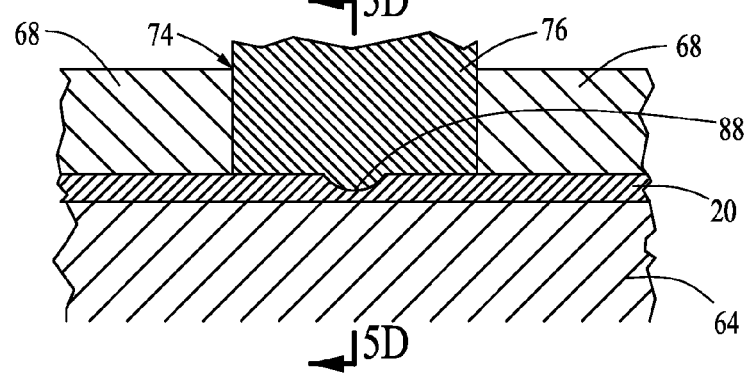
FIG. 5B
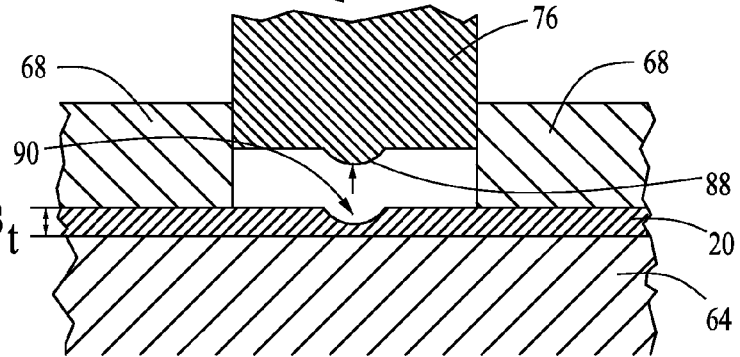
FIG. 5C
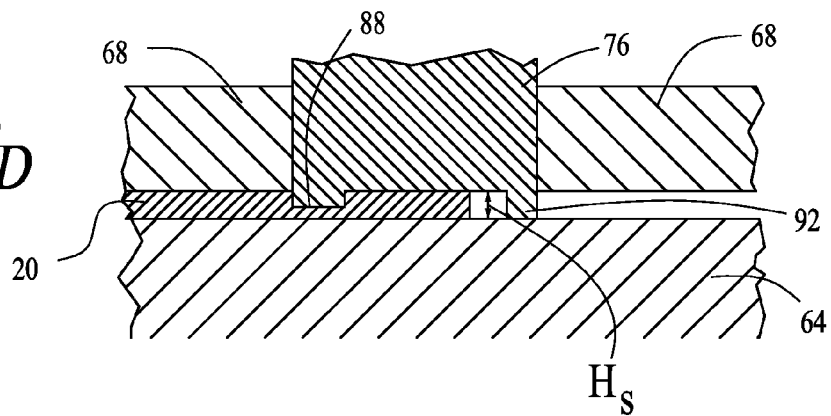
FIG. 5D

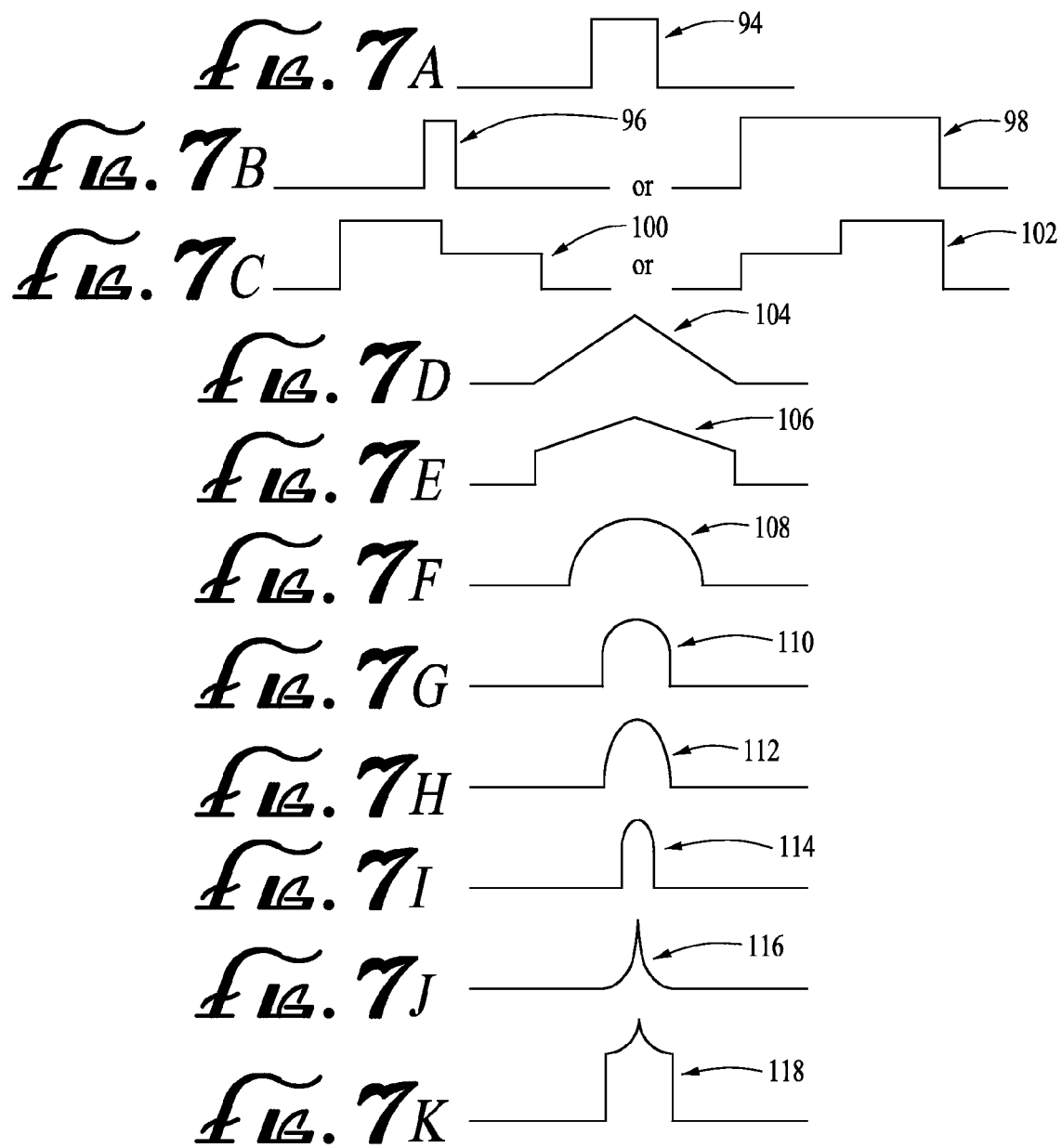

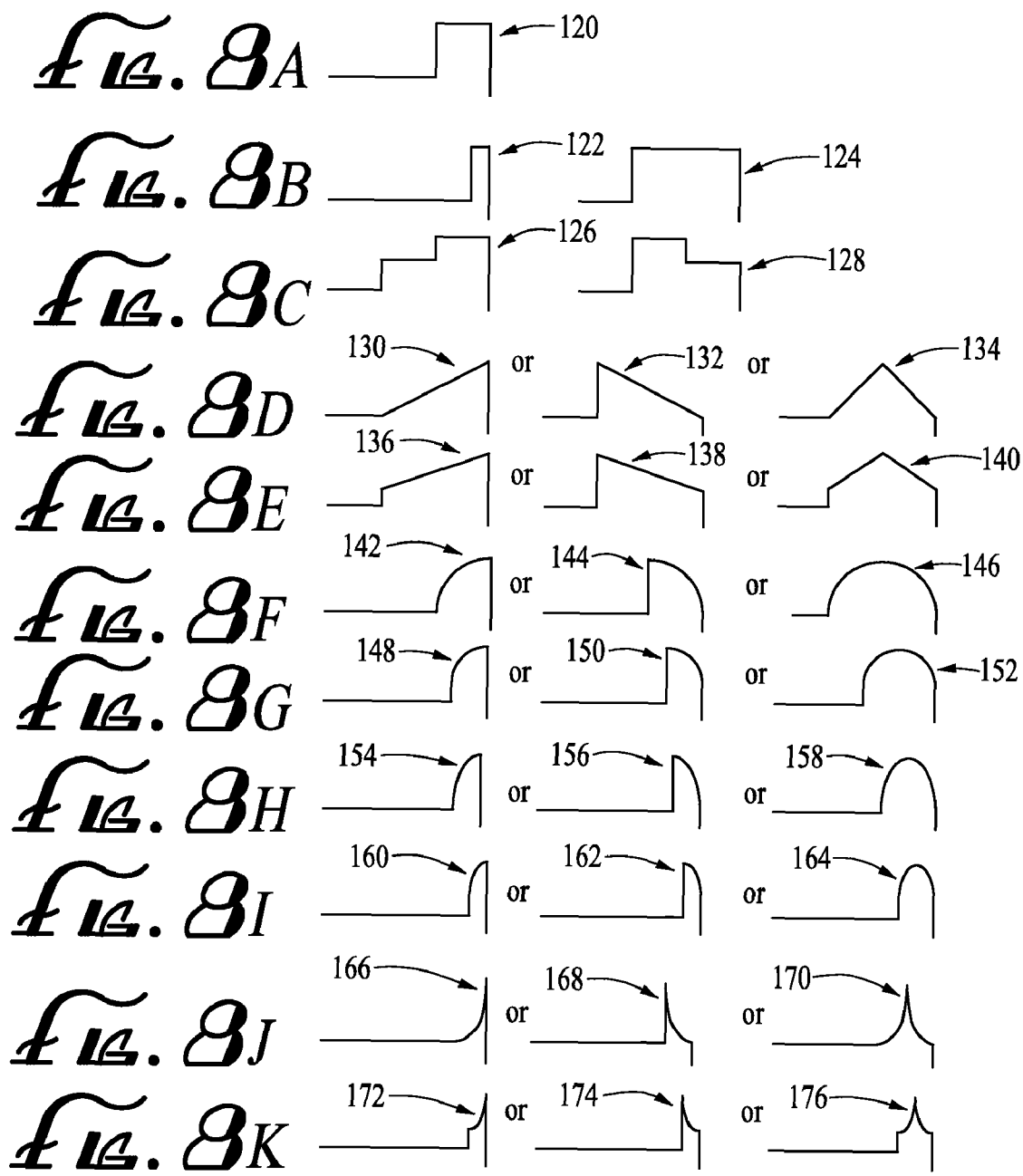

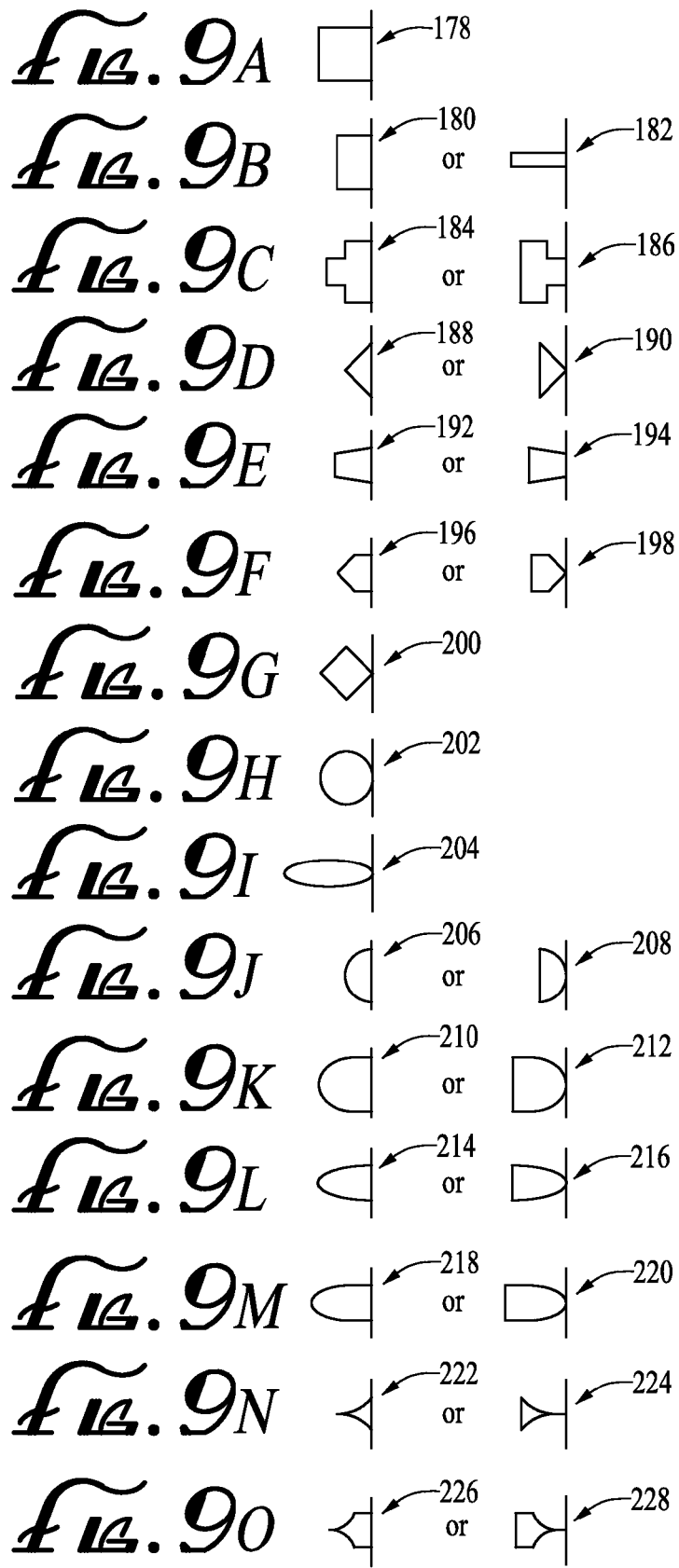

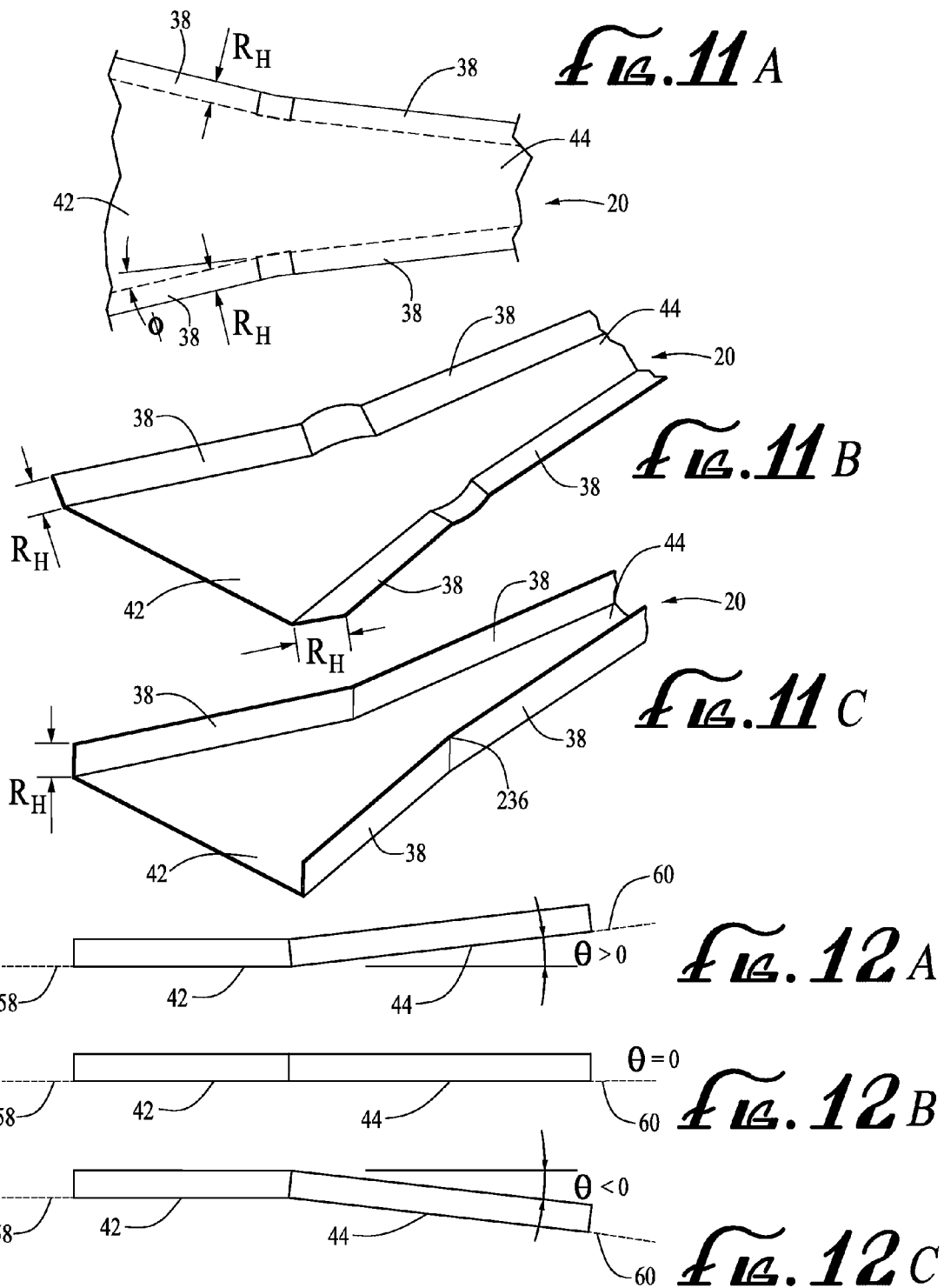

METHOD OF MANUFACTURING A LOAD BEAM TO ADJUST DROOP ANGLE

FIELD OF THE INVENTION

The invention relates generally to the field of disk drive suspensions. More specifically, the invention relates to coined load beams that are configured to be included in disk drive suspensions and a related method of manufacture.

BACKGROUND

Suspensions for suspending sliders in hard disk drives are well known in the art. Referring to FIG. 1, in a typical hard disk drive, the drive's read/write head 10 is included in, or mounted to, a slider 12, which has an aerodynamic design and is supported by a suspension 14. The slider's aerodynamic design allows for airflow between the slider and the disk drive's spinning disk 16. This airflow generates lift, which allows the read/write head to fly above the spinning disk's surface an optimal distance for reading data from, or writing data to, the disk. A typical suspension includes a flexure (not shown), a load beam 20, and a baseplate 22. The slider is bonded to the flexure, also referred to as a gimbal, which permits the slider to pitch and roll as it tracks fluctuations in the surface 24 of the disk.

The flexure (not shown) is coupled to a distal end 26 of the load beam 20, which typically is formed from a flat sheet metal, e.g., stainless steel foil, and includes a spring portion 28 that applies a loading force, also known as a "pre-load" or "gram force," to the slider 12. The pre-load force counteracts the lift that is generated by the interaction between the slider and the spinning disk 16, and brings the slider into a predetermined close spacing to the disk surface 24 while the disk is spinning. The desired pre-load force is achieved by forming one or more bends 30 in the spring portion of the load beam, taking into account the spring constant of the load beam's material, its mass, and the expected load. A proximal end 32 of the load beam is coupled to the baseplate 22, which is configured to couple to an actuator arm 34. The actuator arm moves under motor control to precisely position the slider, and thus, the drive's read/write head 10 relative to the disk surface.

Referring additionally to the views of an example load beam 20 shown in FIGS. 2A-C, the load beam's distal end 26 is generally a rigid structure having its edge regions 36 formed into rails 38 to increase its rigidity. As shown in FIG. 2A, the load beam has a generally triangular shape 40 that is referred to as a double-delta configuration, which includes a first trapezoidal region 42 that is coupled to a second trapezoidal region 44. The rails run the length of both sides 46 of the load beam's first and second trapezoidal regions, and the rails are bent at the points 48 where the first and second trapezoidal regions meet.

During manufacturing, the load beam 20 is cut or etched from a flat sheet of metal forming the example shape 50 shown in FIG. 2B. After the outline of the load beam is cut from the flat sheet of metal, the rails 38 are formed by folding up the edge regions 36 on both sides 46 of the load beam. For reference, fold lines 52 are shown in FIG. 2B. Typically, both of the rails are folded in the same direction perpendicular to the rest of the load beam, i.e., the first and second trapezoidal regions 42 and 44, respectively.

In the case of a double-delta configured load beam 20 having continuous unbroken rails 38 across the intersection of the first and second trapezoidal regions 42 and 44, respectively, the load beam can have a drooped shape 54 after the rails are formed, i.e., folded. Referring additionally to FIG. 2C, the droop, also referred to as unwanted sag, results from the bend 56 at point 48 in each of the rails and can be quantified as the angle θ formed between the plane 58 in which the first trapezoidal region lies, i.e., the first plane, and the plane 60 in which the second trapezoidal region lies, i.e., the second plane. This droop naturally results when the rails are folded because of the limited length of material that makes up the load beam's edge regions 36.

Preferably, a load beam's distal end 26 is a generally planar structure without droop 54. Because of manufacturing variability, the droop, i.e., the angle θ between the first plane 58 and the second plane 60, for double-delta configured load beams 20 can vary. This variation in droop can result in a corresponding variation in the pre-load for the slider 12, which, in turn, affects the disk drive's read/write performance. When a load beam has a double-delta configuration, droop can be reduced by breaking the continuum of the rails 38 by forming a gap (not shown) in each of the rails where the first and second trapezoidal regions 42 and 44, respectively, meet. However, adding this gap lessens the rigidity of the load beam, causing the load beam to offer less resistance to bending than if the rail was continuous. Alternatively, after the rails are formed, the load beam could be subjected to a secondary bending operation that would reverse the droop, that is, overbend the load beam in a direction opposite to the direction of the droop to correct the overall shape of the load beam back into a generally planar shape. However, this secondary bending operation can add additional variability to the value of the load beam's pre-load.

It should, therefore, be appreciated that there is a need for an efficient method for forming a relatively planar double-delta configuration load beam 20 having rails 38 without having to form a gap in each of the rails before bending the rails into position, and without having to reverse bend the load beam to reverse any droop 54 in the load beam. The present invention satisfies these needs.

SUMMARY

Embodiments of the present invention include a coined load beam, a suspension that includes the coined load beam, and a related method for manufacturing the coined load beam. A exemplary method according to the invention is a method for manufacturing a load beam having a bent rail. The method includes providing the load beam before the bent rail is formed, and coining the load beam at a location where the bend will occur in the rail.

In other, more detailed features of the invention, the method further includes providing a punch and using the punch to coin the load beam. Also, the method can further include providing a station to which the punch is coupled, and using the station to move the punch so the punch coins the load beam. In addition, the rail can have an edge, the rail can have a length along the rail's edge, the punch can be configured to form an indentation in the load beam, and the indentation in the load beam can increase the length of the rail's edge.

In other, more detailed features of the invention, the load beam has a double-delta configuration that includes a first region that lies in a first plane, and a second region that is coupled to the first region and lies in a second plane. The indentation increase the length of the rail's edge so, when the bent rail is formed, the position of the first plane relative to the second plane is different than it would have been without the indentation. Also, the load beam can include an edge region and the method can further include forming the bent rail by folding the edge region of the load beam so the edge region no longer lies within the first plane or the second plane.

In other, more detailed features of the invention, the first plane is approximately coplanar to the second plane after the bent rail is formed. Also, the first plane can be at an angle to the second plane after the bent rail is formed, the punch can include a tip having a shape, and the angle between the first plane and the second plane can be determined depending upon the shape of the punch's tip.

An exemplary embodiment of the invention is a load beam that includes an edge region and a bent rail that was formed by folding the edge region of the load beam. The edge region of the load beam was coined before the edge region was folded into the bent rail.

In other, more detailed features of the invention, the edge region was coined at a location where the bend was to occur in the rail. Also, the edge region includes an edge, the edge has a length, and the edge region of the load beam was coined to increase the length of the edge before the edge region was folded into the bent rail.

In other, more detailed features of the invention, the load beam was coined using a punch that included a tip having a shape. The load beam has a double-delta configuration which includes a first region that lies in a first plane and a second region that is coupled to the first region and lies in a second plane. The first plane has an orientation relative to the second plane such that the first plane is approximately coplanar to the second plane, or the first plane and the second plane form an angle having a value that is affected by the shape of the tip.

Another exemplary embodiment of the invention is a suspension that is configured to be used in a disk drive. The suspension includes a load beam having an edge region, and a bent rail that was formed by folding the edge region of the load beam. The edge region of the load beam was coined before the edge region was folded into the bent rail.

In other, more detailed features of the invention, the load beam is coined using a punch that includes a tip having a shape that is configured to form an indentation in the load beam's edge region. The load beam has a double-delta configuration which includes a first region that lies in a first plane, and a second region that is coupled to the first region and lies in a second plane. The first plane and the second plane form an angle, and the value of the angle between the first and second planes is affected by the shape of the punch tip.

Another exemplary embodiment of the invention is a punch that is configured to coin a disk drive suspension load beam having an edge region that includes an edge and is formed into a bent rail. The punch includes a tip that is configured to press into the load beam and to form an indentation in the edge region of the load beam before the edge region is formed into the bent rail. The indentation in the load beam lengthens the edge.

In other, more detailed features of the invention, the punch is made of tungsten carbide, tool steel, heat-treated steel, or ceramic. The punch can be coated with titanium nitride or diamond-like carbon. Also, the tip can have a first shape along a first axis that is a square shape, a rectangular shape, a step shape, a triangular shape, an offset triangular shape, a semicircular shape, an offset semicircular shape, an arched shape, an offset arched shape, a peaked shape, an offset peaked shape, or a combination thereof. In addition, the tip can have a second shape along a second axis that is a square shape, a rectangular shape, a step shape, a triangular shape, an offset triangular shape, a semicircular shape, an offset semicircular shape, an arched shape, an offset arched shape, a peaked shape, an offset peaked shape, or a combination thereof. Furthermore, the tip can have a third shape along a third axis that is selected from the group consisting of a square shape, a rectangular shape, a step shape, a triangular shape, a trapezoidal shape, an offset triangular shape, a diamond shape, a circular shape, an elliptical shape, a semicircular shape, an offset semicircular shape, an arched shape, an offset arched shape, a peaked shape, an offset peaked shape, or a combination thereof.

In other, more detailed features of the invention, the tip can have a height along a first axis that ranges from approximately 0.0050 inch to approximately 0.0051 inch; a width along a second axis that ranges from approximately 0.010 inch to approximately 0.050 inch; and a length along a third axis that ranges from approximately 0.010 inch to approximately 0.050 inch. Also, the punch can further include a stop that is configured to limit a depth of the indentation that is formed in the edge region of the load beam by the tip.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, equations, appended claims, and accompanying drawings, where:

FIG. 1 is a perspective view of an example disk drive suspension and slider.

FIG. 2A is a perspective view of an example load beam having a double-delta configuration.

FIG. 2B is a top plan view of the example load beam shown in FIG. 2A before the load beam's rails are folded.

FIG. 2C is a side elevational view of the example load beam shown in FIG. 2A.

FIG. 3A is a perspective view of an example station that is configured to coin a load beam according to a preferred embodiment. The example station includes a pair of punches, a cover plate, and a base.

FIG. 5A is a partial sectional side view of a load beam and the punch, the cover plate, and the base included in the station shown in FIG. 3A showing the punch moving downward toward the load beam.

FIG. 5B is another partial sectional side view of the load beam, the punch, the cover plate, and the base included in the station shown in FIG. 3A with the punch pressed against the load beam.

FIG. 5C is another partial sectional side view of the load beam, the punch, the cover plate, and the base included in the station shown in FIG. 3A with the punch moving upward and away from the load beam.

FIG. 5D is a partial sectional side view of a distal end of the load beam, the punch, the cover plate, and the base included in FIG. 5B with the punch pressed against the load beam showing the punch's stop in contact with the base.

FIG. 7A is a partial side elevational view of a tip at a distal end of a load beam having a square shape along the first axis according to a preferred embodiment.

FIG. 7B includes partial side elevational views of tips at distal ends of load beams having rectangular shapes along the first axis according to preferred embodiments.

FIG. 7C includes partial side elevational views of tips at distal ends of load beams having step shapes along the first axis according to preferred embodiments.

FIG. 7D is a partial side elevational view of a tip at a distal end of a load beam having a triangular shape along the first axis according to a preferred embodiment.

FIG. 7E is a partial side elevational view of a tip at a distal end of a load beam having an offset rectangular shape along the first axis according to a preferred embodiment.

FIG. 7F is a partial side elevational view of a tip at a distal end of a load beam having a semicircular shape along the first axis according to a preferred embodiment.

FIG. 7G is a partial side elevational view of a tip at a distal end of a load beam having an offset semicircular shape along the first axis according to a preferred embodiment.

FIG. 7H is a partial side elevational view of a tip at a distal end of a load beam having an arched shape along the first axis according to a preferred embodiment.

FIG. 7I is a partial side elevational view of a tip at a distal end of a load beam having an extended arched shape along the first axis according to a preferred embodiment.

FIG. 7J is a partial side elevational view of a tip at a distal end of a load beam having a peaked shape along the first axis according to a preferred embodiment.

FIG. 7K is a partial side elevational view of a tip at a distal end of a load beam having an offset peaked shape along a first axis according to a preferred embodiment.

FIG. 8A is a partial side elevational view of a tip at a distal end of a load beam having a square shape along the second axis according to a preferred embodiment.

FIG. 8B includes partial side elevational views of tips at distal ends of load beams having rectangular shapes along the second axis according to preferred embodiments.

FIG. 8C includes partial side elevational views of tips at distal ends of load beams having step shapes along the second axis according to preferred embodiments.

FIG. 8D includes partial side elevational views of tips at distal ends of load beams having triangular shapes along the second axis according to preferred embodiments.

FIG. 8E includes partial side elevational views of tips at distal ends of load beams having offset triangular shapes along the second axis according to preferred embodiments.

FIG. 8F includes partial side elevational views of tips at distal ends of load beams having semicircular shapes along the second axis according to preferred embodiments.

FIG. 8G includes partial side elevational views of tips at distal ends of load beams having offset semicircular shapes along the second axis according to preferred embodiments.

FIG. 8H includes partial side elevational views of tips at distal ends of load beams having an arched shapes along the second axis according to preferred embodiments.

FIG. 8I includes partial side elevational views of tips at distal ends of load beams having offset arched shapes along the second axis according to preferred embodiments.

FIG. 8J includes partial side elevational views of tips at distal ends of load beams having peaked shapes along the second axis according to preferred embodiments.

FIG. 8K includes partial side elevational views of tips at distal ends of load beams having offset peaked shapes along the second axis according to preferred embodiments.

FIG. 9A is a partial plan view of a tip at a distal end of a load beam having a square shape along the third axis according to a preferred embodiment.

FIG. 9B includes partial plan views of tips at distal ends of load beams having rectangular shapes along the third axis according to preferred embodiments.

FIG. 9C includes partial plan views of tips at distal ends of load beams having step shapes along the third axis according to preferred embodiments.

FIG. 9D includes partial plan views of tips at distal ends of load beams having triangular shapes along the third axis according to preferred embodiments.

FIG. 9E includes partial plan views of tips at distal ends of load beams having trapezoidal shapes along the third axis according to preferred embodiments.

FIG. 9F includes partial plan views of tips at distal ends of load beams having offset triangular shapes along the third axis according to preferred embodiments.

FIG. 9G is a partial plan view of a tip at a distal end of a load beam having a diamond shape along the third axis according to a preferred embodiment.

FIG. 9H is a partial plan view of a tip at a distal end of a load beam having a circular shape along the third axis according to a preferred embodiment.

FIG. 9I is a partial plan view of a tip at a distal end of a load beam having an elliptical shape along the third axis according to a preferred embodiment.

FIG. 9J includes partial plan views of tips at distal ends of load beams having semicircular shapes along the third axis according to preferred embodiments.

FIG. 9K includes partial plan views of tips at distal ends of load beams having offset semicircular shapes along the third axis according to preferred embodiments.

FIG. 9L includes partial plan views of tips at distal ends of load beams having arched shapes along the third axis according to preferred embodiments.

FIG. 9M includes partial plan views of tips at distal ends of load beams having offset arched shapes along the third axis according to preferred embodiments.

FIG. 9N includes partial plan views of tips at distal ends of load beams having peaked shapes along the third axis according to preferred embodiments.

FIG. 9O includes partial plan views of tips at distal ends of load beams having offset peaked shapes along the third axis according to preferred embodiments.

FIG. 11A is a top plan view of an embodiment of a coined load beam according to a preferred embodiment.

FIG. 11B is a perspective view of the coined load beam shown in FIG. 11A with the rails partially folded.

FIG. 11C is a perspective view of the coined load beam shown in FIG. 11A with the rails folded into their final positions.

FIG. 12A is a side elevational view of an embodiment of a coined load beam having a droop angle that is greater than zero according to a preferred embodiment.

FIG. 12B is a side elevational view of another embodiment of a coined load beam having a droop angle that is approximately zero according to a preferred embodiment.

FIG. 12C is a side elevational view of another embodiment of a coined load beam having a droop angle that is less than zero according to a preferred embodiment.

DETAILED DESCRIPTION

Figure 3B:
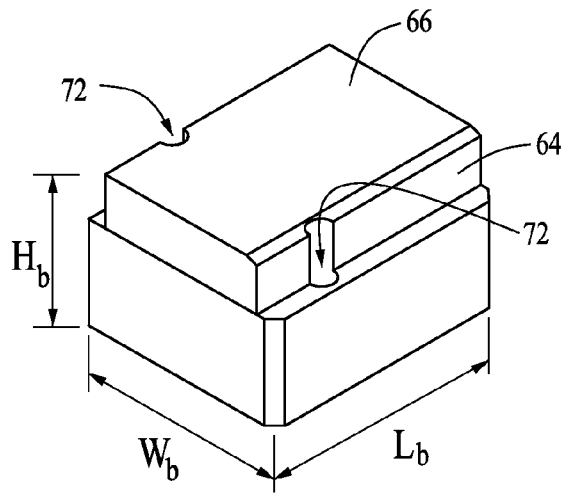
FIG. 3B is a perspective view of an example base according to a preferred embodiment.

The present invention alters the length of the rails 38 in double-delta configured load beams 20 to reduce or eliminate droop 54, or to reduce droop variability. As previously discussed, a load beam that includes a double-delta configuration includes a first trapezoidal region 42, aka a first region, which lies in a first plane 58 and is coupled to a second trapezoidal region 44, aka a second region, which lies in a second plane 60. In embodiments of the invention, the length of the rails are increased slightly before the rails are folded so the first plane of the first trapezoidal region remains approximately coplanar with the second plane of the second trapezoidal region after the rails are folded. More specifically, the metal that makes of the rails is lengthened using a coining process before the rails are folded, e.g., while the load beam is still a flat piece of metal. In other embodiments, the droop, or the angle, between the first plane and the second plane is adjusted to be a predetermined value by coining the rails using a punch having a known tip shape and size before the rails are folded.

FIG. 3A is an illustration of an example work station 62 where flat load beams 20 are coined as part of a manufacturing process according to the invention after the load beams have been cut from a sheet of metal, and before the rails 38 of the load beam are folded. Referring additionally to FIG. 3B, the station includes a base 64, which has a relatively flat top surface 66 on which the load beam is positioned before coining. The base can be made of, for example, tungsten carbide, tool steel, or ceramic, and typically has a height "$H_b$" of approximately 0.750 inch, a width "$W_b$" of approximately 1.000 inch, and a length "$L_b$" of approximately 1.200 inches.

Figure 3D:
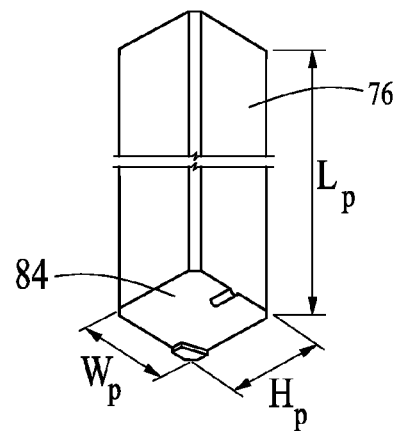
FIG. 3D is a partial perspective view of an example punch according to a preferred embodiment.
Figure 3C:
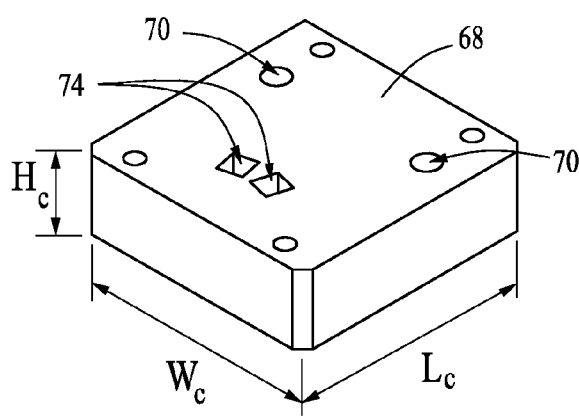
FIG. 3C is a perspective view of an example cover plate according to a preferred embodiment.

Referring additionally to FIG. 3C, the station 62 also includes a cover plate 68, which is configured to rest on top of the base 64 and the load beam 20, and to hold the load beam in place between the base and the cover plate during the coining process. As shown in FIGS. 3A and 3C, the cover plate is a separate block of material that can be secured into position over the base. For example, in the embodiment shown in FIGS. 3A and 3C, the cover plate includes a pair of securing bores 70 that are configured to receive dowels that are coupled to the base by inserting the dowels into dowel holes 72. In this embodiment, the cover plate can be secured to the base by initially lining up the cover plate's securing bores with the dowels that extend upward from the base, and dropping the cover plate on top of the base so the dowels insert into the securing bores.

Figure 4:
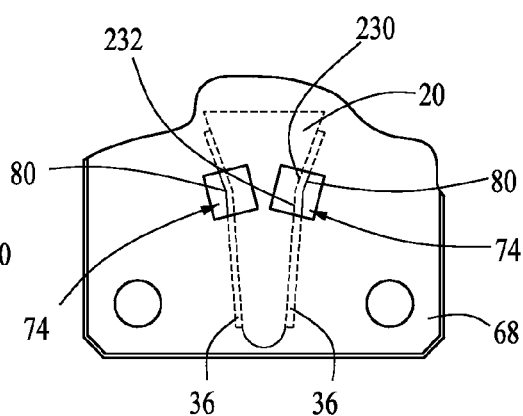
FIG. 4 is a partial top plan view of an example cover plate that is included in the station shown in FIG. 3A.

The cover plate 68 can be made of, for example, tungsten carbide, tool steel, or ceramic, and typically has a height "$H_c$" of approximately 0.375 inch, a width "$W_c$" that ranges from approximately 1.178 inches to approximately 1.182 inches, and a length "$L_c$" that ranges from approximately 1.198 inches to approximately 1.202 inches. The cover plate also includes two processing bores 74, each having a generally square cross section, which are configured to receive two punches 76 (see FIG. 3D) that extend downward from a punch retainer 78, as shown in FIG. 3A. Referring additionally to FIG. 4, which is a partial top plan view of a region of the cover plate that includes the processing bores. Edges 80 of the load beam, which is covered by the cover plate, can be seen through the processing bores.

Referring again to FIGS. 3A and 3D, which is a perspective view of an example punch 76, the punches are secured to a top part 82 of the station 62 via the punch retainer 78 that is configured to receive the punches and to couple to the top part. The top part is configured to move up and down in a vertical manner, and thus, alter the position of the punches relative to the load beam 20, the cover plate 68, and the base 64. The punches can be made of, for example, tungsten carbide, tool steel, heat-treated steel, or ceramic, and typically have a height "$H_p$" that ranges from approximately 0.1248 inch to approximately 0.1250 inch, a width "$W_p$" that ranges from approximately 0.1248 inch to approximately 0.1250 inch, and a length "$L_p$" that ranges from approximately 2.055 inches to approximately 2.065 inches. Also, the punches can be coated with a material, e.g., titanium nitride or diamond-like carbon ("DLC"), that enhances wear resistance, reduces part galling, and decreases particulate generation.

During the coining process, the load beam 20, the cover plate 68, and the punches 76 are aligned so that a distal end 84 of each punch, when lowered by the top part 82 of the station 62, will contact an edge region 36 of the load beam where the first trapezoidal region 42 meets the second trapezoidal region 44 of the load beam. In particular, a user can prompt the station's top part to move downward toward the base 64. As the top part moves downward, both punches move toward the cover plate, and the distal ends of punches eventually insert into the cover plate through the processing bores 74. With continued downward movement of the station's top part, the distal ends of the punches contact the load beam and deform the sheet of material that makes up the load beam.

Referring additionally to the partial cross-sectional side views shown in FIGS. 5A-D, the distal end 84 of one of the punches 76 is shown pushing down through a processing bore 74 in the cover plate 68 (see FIG. 5A), pressing down into the top surface 86 of the load beam 20 (see FIG. 5B), which is supported on the base 64, and then lifting away from the load beam and upward back through the processing hole (see FIG. 5C). The cover plate holds the load beam in place throughout the coining process and particularly as the punch is drawn upward and away from the load beam. The example punch shown in FIGS. 5A-D includes a rounded, semicircular tip 88, which pushes into the load beam and leaves a corresponding semicircular indentation 90 in the load beam when it lifts back from the top surface of the load beam. After the station's top part 82 lifts the punches above the cover plate, the cover plate can be lifted off the load beam, and the coined load beam can be lifted off of the base and moved from the station 62 to another location, e.g., another station, where additional processing steps can be performed on the load beam, e.g., the rails 38 can be folded.

The punch 76 coins the load beam 20 by striking the load beam along its edge regions 36, and in doing so, pushes the load beam material out and away from its initial location. As shown in FIG. 5C, the coining process results in an indentation 90 in the load beam. In example embodiments, the thickness "$LB_t$" of the load beam can range from approximately 0.0004 inch to approximately 0.004 inch before coining. After coining, the load beam in the location of the indentation can have a thickness that ranges from approximately 0.00005 inch to approximately the thickness "$LB_t$" of the load beam minus 0.00005 inch. Referring additionally to FIG. 5D, in addition to the tip 88, the distal end 84 of the punch includes a stop 92, which is configured to contact the base 64 after the tip of the punch impacts the load beam. The dimensions of the stop and the location of the stop on the distal end of the punch are configured such that the stop does not touch the load beam during the coining process, and the stop prevents the tip from pushing through the entire thickness "LB$_t$" of the load beam. Thus, the stop limits the depth of the indentation that is formed in the edge region of the load beam. For example, as shown in the embodiment of FIG. 5D, the height "H$_s$" of the stop matches the thickness of the load beam "LB$_t$". In other embodiments, the height of the stop may be greater than the load beam's thickness.

Figure 6A:
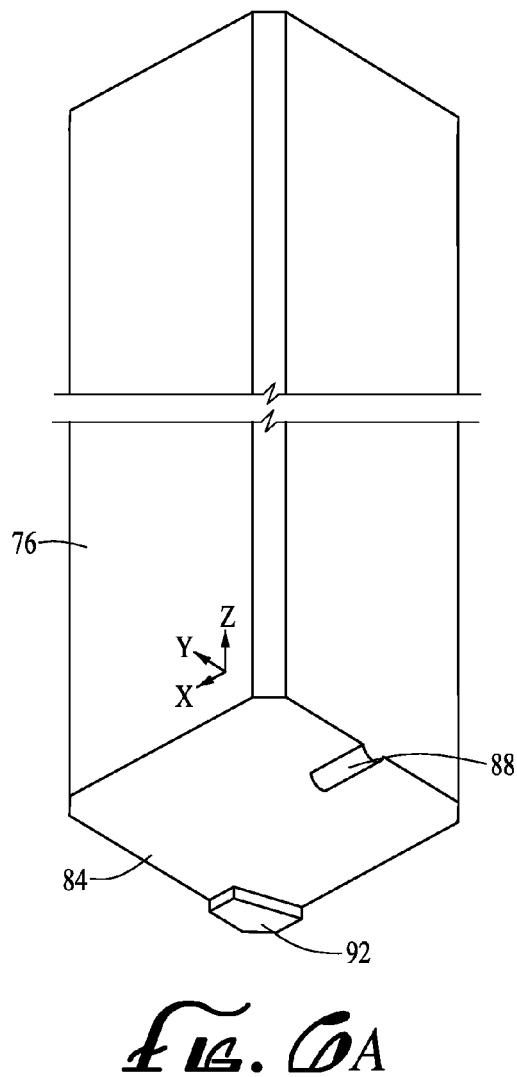
FIG. 6A is a partial perspective view the punch shown in FIGS. 5A-D.
Figure 6B:
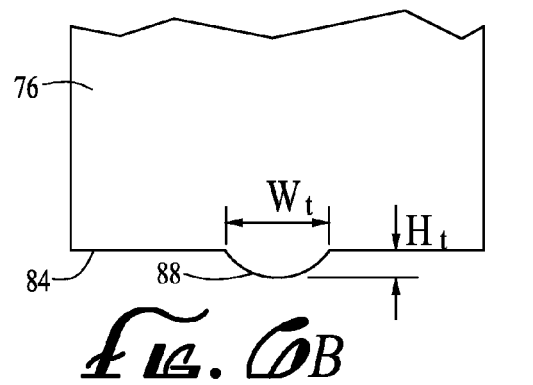
FIG. 6B is a partial side elevational view of a distal end of the load beam shown in FIG. 6A as seen along a first axis.
Figure 6C:
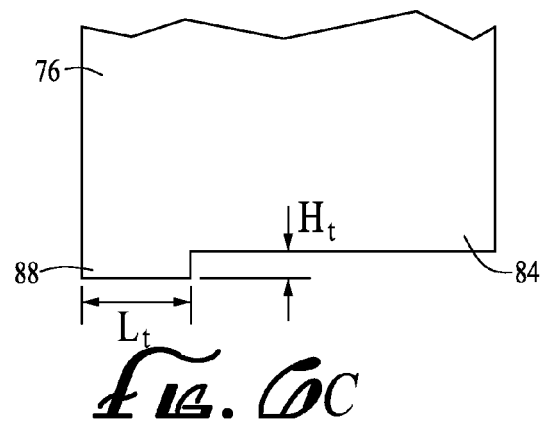
FIG. 6C is a partial side elevational view of the distal end of the load beam shown in FIG. 6A as seen along a second axis.
Figure 6D:
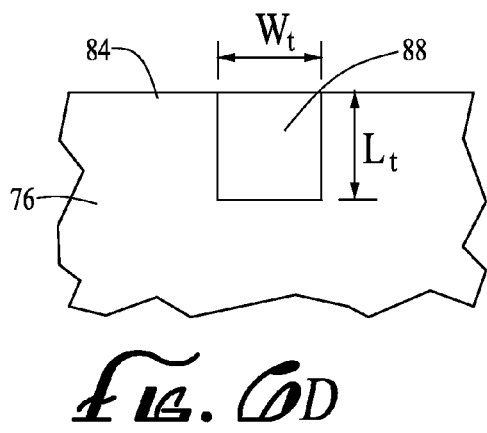
FIG. 6D is a partial plan view of the distal end of the load beam shown in FIG. 6A as seen along a third axis.

Referring additionally to FIGS. 6A-D, a partial perspective view is shown in FIG. 6A of the example punch 76 shown in FIGS. 5A-D with the associated directional axes, i.e., the x-axis, the y-axis, and z-axis, in agreement with the corresponding axes shown in FIG. 5A. The punch's distal end 84 includes a tip 88 that is semicircular when viewed along the x-axis (see FIG. 6B) and having a height "H$_t$", and rectangular when viewed along either the y or the z axes (see FIGS. 6C and 6D, respectively). The tip has a length "L$_t$" along the y-axis and a width "W$_t$" along the z-axis. The height "H$_t$", width "W$_t$", and length "L$_t$" of a punch tip can vary greatly depending upon the thickness "LB$_t$" of the load beam 20 and the desired dimensions of the resulting indentation 90 in the load beam. For example, the height "H$_t$" of the tip can ranges from approximately the height "H$_s$" of the stop 92 minus 0.00005 inch, e.g., approximately 0.0050 inch, to approximately the height "H$_s$" of the stop minus the thickness "LB$_t$" of the load beam plus 0.00005 inch, e.g., approximately 0.0051 inch, when the thickness "LB$_t$" of the load beam ranges in value from approximately 0.0004 inch to approximately 0.004 inch. Also, the width "W$_t$" of the tip typically ranges from approximately 0.010 inch to approximately 0.050 inch, and the length "L$_t$" of the tip typically ranges from approximately 0.010 inch to approximately 0.050 inch.

While the example punch 76 shown in FIGS. 5A-D and FIGS. 6A-D has a rounded semicircular tip 88, the tip of a punch according to embodiments of the invention can be any of a wide variety of shapes including the example shapes 94-224 shown in the partial side elevational views of various example tips of FIGS. 7-9. In particular, FIGS. 7A-K show generalized example tip shapes 94-118 as viewed along the x-axis (see FIGS. 5A and 6A for the orientation of the x-axis relative to the punch). The example shapes illustrated in FIGS. 7A-K include a square shape 94 (see FIG. 7A), rectangular shapes 96 and 98 (see FIG. 7B), step shapes 100 and 102 (see FIG. 7C), a triangular shape 104 (see FIG. 7D), an offset triangular shape 106 (see FIG. 7E), a semicircular shape 108 (see FIG. 7F) (the shape of the tip shown in FIGS. 5A-D and FIGS. 6A-6D), an offset semicircular shape 110 (see FIG. 7G), an arched shape 112 (see FIG. 7H), an offset arched shape 114 (see FIG. 7I), a peaked shape 116 (see FIG. 7J), and an offset peaked shape 118 (see FIG. 7K). The punch tip can have other shapes as viewed along the x-axis, for example, combinations of any of the general shapes shown in FIGS. 7A-K.

Referring additionally to FIGS. 8A-K, the tip 88 along the y-axis direction can have various shapes. Several example tip shapes 120-176 are shown in the partial side elevational views of FIGS. 8A-K, for example, a square shape 120 (see FIG. 8A), rectangular shapes 122 and 124 (see FIG. 8B), step shapes 126 and 128 (see FIG. 8C), triangular shapes 130-134 (see FIG. 8D), offset triangular shapes 136-140 (see FIG. 8E), semicircular shapes 142-146 (see FIG. 8F), offset semicircular shapes 148-152 (see FIG. 8G), arched shapes 154-158 (see FIG. 8H), offset arched shapes 160-164 (see FIG. 8I), peaked shapes 166-170 (see FIG. 8J), and offset peaked shapes 172-176 (see FIG. 8K). The punch tip can have other shapes as viewed along the y-axis, for example, combinations of any of the general shapes shown in FIGS. 8A-K.

Referring additionally to FIGS. 9A-O, the shape of the tip 88 looking vertically down on along the z-axis direction can vary greatly. For example, the tip, as viewed along the z-axis direction, can have a square shape 178 (see FIG. 9A), rectangular shapes 180 and 182 (see FIG. 9B), step shapes 184 and 186 (see FIG. 9C), triangular shapes 188 and 190 (see FIG. 9D), trapezoidal shapes 192 and 194 (see FIG. 9E), offset triangular shapes 196 and 198 (see FIG. 9F), a diamond shape 200 (see FIG. 9G), a circular shape 202 (see FIG. 9H), an elliptical shape 204 (see FIG. 9I), semicircular shapes 206 and 208 (see FIG. 9J), offset semicircular shapes 210 and 212 (see FIG. 9K), arched shapes 214 and 216 (see FIG. 9L), offset arched shapes 218 and 220 (see FIG. 9M), peaked shapes 222 and 224 (see FIG. 9N), or offset peaked shapes 226 and 228 (see FIG. 9O).

Figure 10:
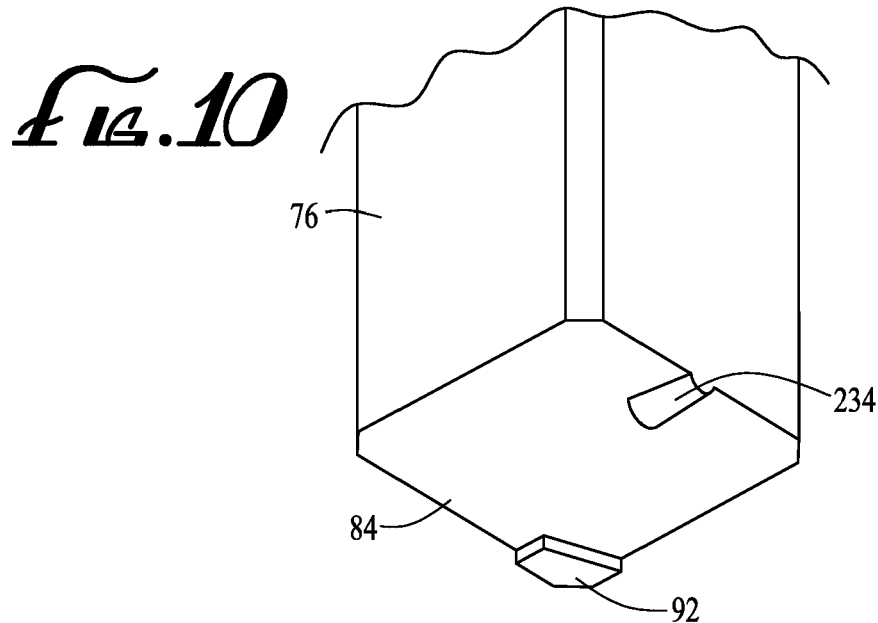
FIG. 10 is a partial perspective view of a punch having a conically shaped tip.

Because the shape of the tip 88 can taper along one or more of the three axes, i.e., the x-axis, the y-axis, and the z-axis, embodiments of the tip can make an indentation 90 that is deeper and/or wider at the edge 80 (see FIG. 4) of the rail 38. In these embodiments, more pressure is applied by the tip at the edge of the rail and less at the inside edge 230 of the rail adjacent to where the fold is to occur (see the fold line 232). This results in the edge 80 of the rail being lengthened more than in regions of the rail 230 that are closer to where the rail is to be folded. An example of a tip having a tapered shape is shown in FIG. 10, which is a partial perspective view of a conically shaped tip 234 having views along the x, y, and z axes as shown in FIGS. 7F, 8E, and 9E, respectively.

Referring additionally to the top plan view shown in FIG. 11A of an example embodiment of a load beam 20 that has been coined, the extra length that needs to be added to the rail 38 so that the first trapezoidal region 42 and the second trapezoidal region 44 are coplanar after the load beam rails are folded into their final position (see the perspective view of FIG. 11C) can be calculated based on the following equation:

Extra Length=$2\pi * R_H * \phi / 360°$

Where:

$R_H$ is the rail height as shown in FIG. 11A, and $\phi$ is the difference in angle in degrees between the first trapezoidal region and the second trapezoidal region as shown in FIG. 11A.

For example, if the height of the rail ("$R_H$") is 0.0075 inch and the difference in angle between the first trapezoidal region and second trapezoidal region is 7.93°, then the extra length that is added to the rail after coining is $2\pi*0.0075$ inch*7.93°/360°, which equals 0.001 inch.

In FIGS. 11A-C, embodiments of the load beam 20 are shown that already has been coined using a pair of punches 76 with each punch having a tip 88 with a semicircular shape 108 in the x-direction, a rectangular shape 124 in the y-direction, and a rectangular shape 182 in the z-direction. FIG. 11A shows the load beam after the load beam was coined and before the load beam's rails 38 are folded. FIG. 11B shows the load beam's rails being folded up on both sides. FIG. 11C shows the load beam after the rails have been folded completely into their final positions, as bent rails 236.

As previously noted, the load beam rails 38 after coining have additional length that aids in maintaining the flatness of the load beam 20 after the rail folding process is complete. In addition to using the coining process to add length to the rails so that the load beam can remain planar after the rails are folded, the coining process can be modified, for example, by using a punch tip 88 that has a different shape in one or more of the axial directions. By using a tip having a different shape 94-228, or a tip having different dimensions, i.e., H$_t$, W$_t$, and/or $L_t$, the shape and dimension of the resulting indentation 90 in the load beam can be changed, which, in turn, affects the amount and the location of the additional length that is added to the rail. This change in the rail length affects the angle θ between the first plane 58 and the second plane 60 of the double-delta configuration load beam after the rails are folded. In fact, the shape of the tip dictates the amount of increased rail length, and therefore, dictates the amount of droop 54 for the coined load beam. Accordingly, by carefully selecting the shape and dimension of the punch's tip, the load beam's droop can be predetermined.

This variability in droop 54 is shown in the side elevational view of FIGS. 12A-C. FIG. 12A shows an embodiment of a coined load beam 20 where the second trapezoidal region 44 is bent upward relative to the first trapezoidal region 42, and thus, the angle θ between the first plane 58 and the second plane 60 is greater than zero. In another embodiment shown in FIG. 12B, the first trapezoidal region and the second trapezoidal region are approximately coplanar, and thus, the angle θ between the first and second planes is approximately zero. In an additional embodiment shown in FIG. 12C, the second trapezoidal region is bent downward from the first trapezoidal region, and thus, the angle θ between the first plane and the second plane is less than zero.

Accordingly, the angular distinction between the first and second planes 58 and 60, respectively, can be adjusted and/or designed to be a specific value using the coining process of invention. More specifically, the type of punch tip 88 used to coin the load beam 20 helps to determine the final angular position θ of the second trapezoidal region 44 relative to the first trapezoidal region 42 after the rails 38 are folded into place. By fine tuning the shape 94-228 of the tip of the punch, and therefore the amount the rail is lengthened, the angle θ of droop 54 in the load beam can be fine tuned to be a specific predetermined value, e.g., a value of approximately zero, greater than zero, or less than zero. So, the angle of load beam droop is predictable as a result of the coining process described herein.

Figure 13:
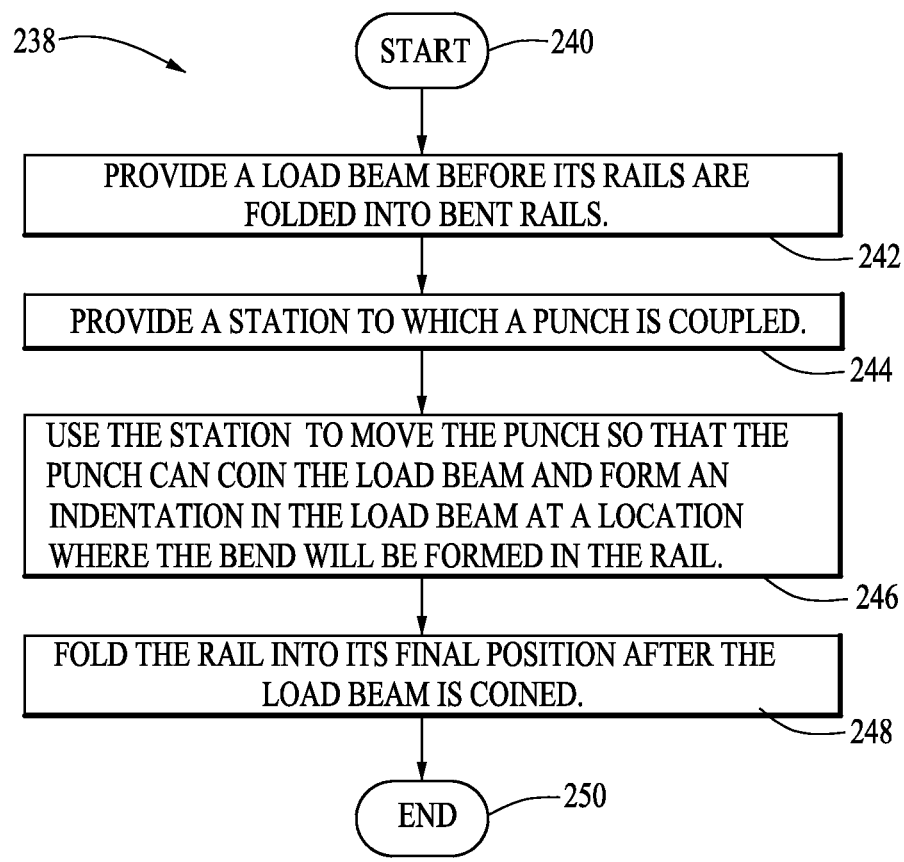
FIG. 13 is a flowchart for an example method of manufacturing a coined load beam according to the invention.

An exemplary method for manufacturing a coined load beam according to the invention is illustrated in the algorithm 238 of FIG. 13. After starting the method at step 240, the next step 242 is to provide a load beam 20 before its rails 38 are folded into bent rails 236. Next, at step 244, a station 62 is provided which includes a punch 76 that is configured to coin the load beam. At step 246, the station is used to move the punch so that the punch coins the load beam and forms an indentation 90 in the load beam at a location 48 where the bend 56 will eventually be formed in the bent rail 236. Next, after the load beam is coined, the rail 38 is folded into its final position at step 248. The method ends at step 250.

Advantageously, the coining process of this invention and its associated hardware, e.g., the punch 76 and the punch tip 88, eliminate or minimize unwanted droop 54 in disk drive suspensions 14. Also, by adjusting the shape 94-228 and/or dimensions, i.e., $H_t$, $W_t$, and/or $L_t$, of the punch tip, the amount of length that is added to the coined rails 38, and thus, the amount of droop can be selected to be a particular value. So, the amount of droop in load beams manufactured according to the invention is infinitely variable.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

I claim:

1. A method for manufacturing a load beam having a rail having a bend therein, the load beam further having an edge region, the method comprising:
   a. before the edge region of the load beam is bent to form the bent rail, coining the load beam at a location where the bend will occur in the rail, said coining being performed by pressing a punch into the load beam, the punch comprising a tip that is configured to press into the load beam and to form an indentation in the edge region of the load beam, the indentation in the load beam lengthening the edge region; and
   b. bending the rail to form said bend therein.

2. The method according to claim 1, wherein the punch is made of a material that is selected from the group consisting of tungsten carbide, tool steel, heat-treated steel, and ceramic.

3. The method according to claim 1, wherein the punch is coated with a material that is selected from the group consisting of titanium nitride and diamond-like carbon.

4. The method according to claim 1, wherein:
   the tip has a first shape along a first axis that is selected from the group consisting of a square shape, a rectangular shape, a step shape, a triangular shape, an offset triangular shape, a semicircular shape, an offset semicircular shape, an arched shape, an offset arched shape, a peaked shape, an offset peaked shape, and a combination thereof.

5. The method according to claim 4, wherein:
   the tip has a second shape along a second axis that is selected from the group consisting of a square shape, a rectangular shape, a step shape, a triangular shape, an offset triangular shape, a semicircular shape, an offset semicircular shape, an arched shape, an offset arched shape, a peaked shape, an offset peaked shape, and a combination thereof.

6. The method according to claim 5, wherein:
   the tip has a third shape along a third axis that is selected from the group consisting of a square shape, a rectangular shape, a step shape, a triangular shape, a trapezoidal shape, an offset triangular shape, a diamond shape, a circular shape, and elliptical shape, a semicircular shape, an offset semicircular shape, an arched shape, an offset arched shape, a peaked shape, an offset peaked shape, and a combination thereof.

7. The method according to claim 1, wherein:
   a. the tip has a height along a first axis;
   b. the tip has a width along a second axis that ranges from approximately 0.010 inch to approximately 0.050 inch; and
   c. the tip has a width along a third axis that ranges from approximately 0.010 inch to approximately 0.050 inch.

8. The method according to claim 1 wherein the punch further comprises a stop that is configured to limit a depth of the indentation that is formed in the edge region of the load beam by the tip.

9. The method of claim 1 wherein:
the load beam has a double-delta configuration, the double-delta configuration including a first region that lies in a first plane and a second region that lies in a second plane; and
the first plane is approximately coplanar to the second plane after the rail is bent, the position of the first plane relative to the second plane being different than it would have been without the indentation.

10. The method of claim 1 wherein the indentation is coined into the load beam at a location that is adjacent to both the first region and the second region.

11. The method of claim 1 wherein the indentation is at a location where the first region meets the second region.

12. A method for manufacturing a load beam having a double-delta configuration, the double-delta configuration including a first region that lies in a first plane and a second region that lies in a second plane, the load beam further having a rail, the rail having a bend therein and also having a rail edge, the method comprising:
 a. using a punch to coin the load beam to form an indentation therein at a location where the bend in the rail edge will occur, the indentation increasing a length of the rail edge;
 b. then bending the rail and;
 c. wherein the first plane is approximately coplanar to the second plane after the rail is bent, and the position of the first plane relative to the second plane is different than it would have been without the indentation.

13. A method for manufacturing a load beam, comprising:
securing a flat piece of metal so that the flat piece of metal can be worked, the flat piece of metal including two differently shaped regions thereof;
lengthening opposite edges of the flat piece of metal by working the metal within an area where the two differently shaped regions meet;
after the metal has been worked to lengthen the opposite edges, then bending the edges to form stiffening edge rails of the load beam; and
coupling the load beam to a means for coupling the load beam to an actuator arm.

14. The method of claim 13 wherein the lengthening of the opposite edges by working the metal comprises pressing one or more punches into the piece of flat metal at two different locations to create two respective indentations into the metal on opposite lateral sides thereof, the indentations being disposed between the two differently shaped regions of the flat metal.

15. The method of claim 14 wherein, after the lengthening and bending steps, the stiffening edge rails each include respective ones of the two indentations.

16. The method of claim 13 wherein the two differently shaped regions are each trapezoidal.

17. The method of claim 13 wherein after said bending, the two differently shaped regions are generally coplanar, but would not have been coplanar without the indentations have been formed in the load beam.

* * * * *